H. GROB.
COOKING UTENSIL.
APPLICATION FILED FEB. 11, 1920.
1,338,830.
Patented May 4, 1920.
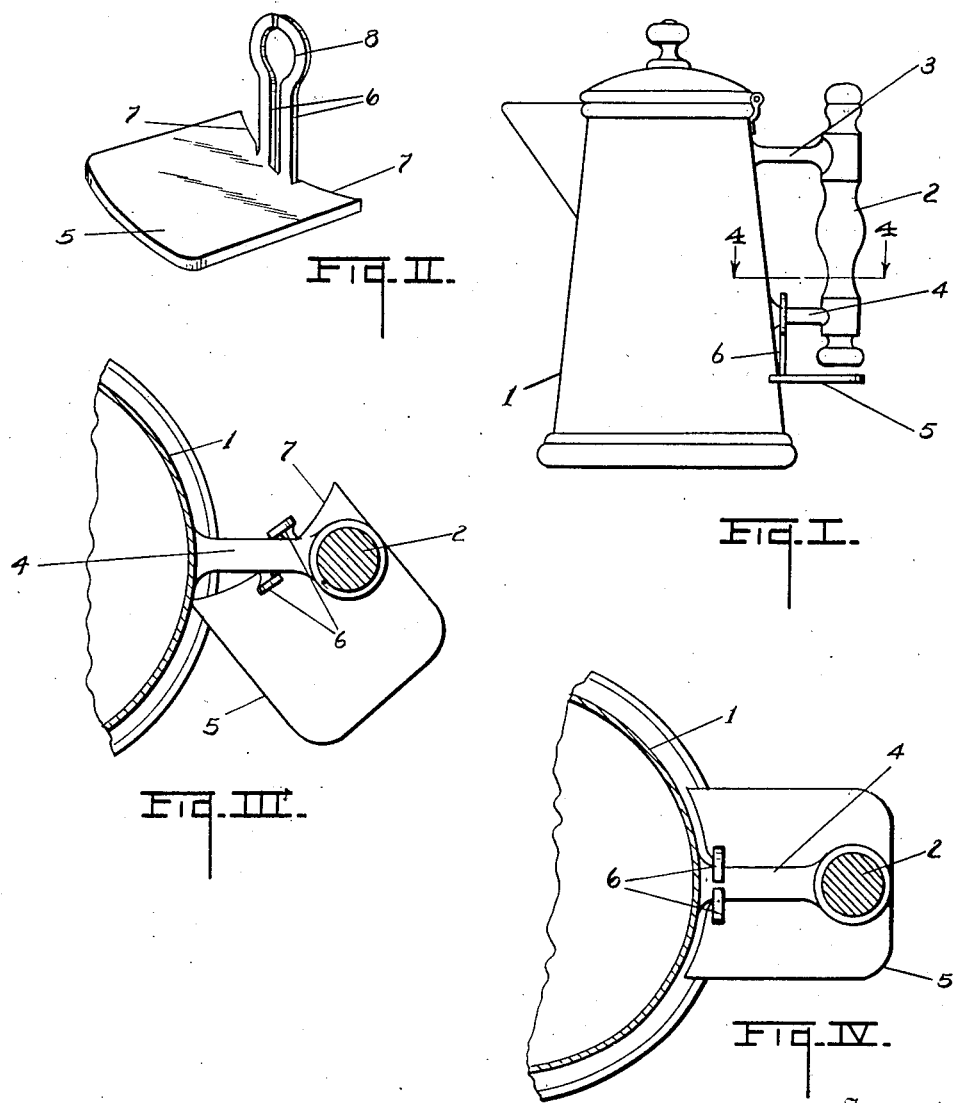
Inventor
HENRY GROB
Witnesses
Lenn Gilman
Fred Ullrich
By Chappell & Earl
Attorneys

UNITED STATES PATENT OFFICE.

HENRY GROB, OF DETROIT, MICHIGAN.

COOKING UTENSIL.

1,338,830. Specification of Letters Patent. Patented May 4, 1920.

Application filed February 11, 1920. Serial No. 357,914.

*To all whom it may concern:*

Be it known that I, HENRY GROB, a citizen of the United States, residing at Detroit, county of Wayne, State of Michigan, have invented certain new and useful Improvements in Cooking Utensils, of which the following is a specification.

This invention relates to improvements in cooking utensils.

The main objects of this invention are:

First, to provide in a cooking utensil or vessel such as a coffee or tea pot, an improved guard or shield for the handle whereby it is guarded from the flames and heat.

Second, to provide in a structure of the class described, an improved guard which may be readily attached to and used in connection with cooking utensils of a type in quite general use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side view of a coffee pot embodying the features of my invention.

Fig. II is a perspective view of my improved handle guard as shown in Fig. I, removed from the coffee pot.

Fig. III is a detail view partially in horizontal section showing the manner of engaging and disengaging my improved handle.

Fig. IV is a detail horizontal section on a line corresponding to line 4—4 of Fig. I.

In the drawing similar reference characters refer to similar parts throughout the several views, and the sectional views are taken looking in the direction of the little arrows at the ends of the section lines.

I have shown my improvements in connection with a coffee pot 1 of conventional design. The handle 2 is disposed vertically at one side and provided with arms 3 and 4 at the top and bottom, secured to the body of the vessel in any suitable manner.

The guard or shield 5 is provided with upwardly projecting spring arms 6 formed integrally with the guard and adapted to be engaged over the lower handle arm 4 so as to support the guard or shield with its inner edge 7 resting against the body of the vessel.

The spring arms 6 are conformed at 8 to fit around or clasp the arm 4 of the handle and may be easily engaged over the arm 4 or disengaged therefrom by a twisting movement as shown in Fig. III.

With the parts thus arranged, the guard or shield is supported horizontally in a spaced relation to the lower end of the handle so that the handle is guarded from the flames and the products of combustion passing up at the side of the vessel, not only preventing the handle becoming too hot to grasp but also greatly adding to the life of the handle by preventing its being burned or becoming unduly heated.

I have illustrated my improvements in a simple and practical embodiment as designed for the market. I have not attempted to illustrate or describe certain modifications which might be desirable to adapt my improvements to vessels or receptacles having other shapes or forms of handles as I believe the disclosure made will enable those skilled in the art to embody or adapt the same as may be desired.

Having thus described my invention, what I claim as new and desire to secure by Letters Patent, is:

1. The combination with a cooking vessel, of a handle therefor disposed vertically at one side and secured to the vessel by arms, and a shield having a pair of upwardly projecting integral spring arms coacting to detachably engage the lower handle arm whereby the shield is supported horizontally below the handle with its inner edge resting against the side of the vessel, said inner edge being curved to correspond to the curvature of the vessel.

2. The combination with a cooking vessel, of a handle therefor disposed vertically at one side and secured to the vessel by arms, and a shield having a pair of upwardly projecting integral spring arms coacting to detachably engage the lower handle arm whereby the shield is supported horizontally below the handle with its inner edge resting against the side of the vessel.

In witness whereof, I have hereunto set my hand and seal in the presence of two witnesses.

HENRY GROB. [L. S.]

Witnesses:
EMIL A. GROB,
JOS. S. KIRCHNER.